United States Patent
Adolph et al.

(10) Patent No.: US 7,409,409 B2
(45) Date of Patent: Aug. 5, 2008

(54) METHOD FOR EDITING A RECORDED STREAM OF APPLICATION PACKETS, AND CORRESPONDING STREAM RECORDER

(75) Inventors: Dirk Adolph, Ronnenberg (DE); Wolfgang Klausberger, Hannover (DE); Hui Li, Hannover (DE); Ralf Ostermann, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 638 days.

(21) Appl. No.: 10/498,361

(22) PCT Filed: Nov. 30, 2002

(86) PCT No.: PCT/EP02/13553

§ 371 (c)(1),
(2), (4) Date: Jun. 10, 2004

(87) PCT Pub. No.: WO03/050811

PCT Pub. Date: Jun. 19, 2003

(65) Prior Publication Data

US 2005/0013243 A1    Jan. 20, 2005

(30) Foreign Application Priority Data

Dec. 11, 2001  (EP)  ................................. 01250435

(51) Int. Cl.
  *G06F 17/00*  (2006.01)
  *G11B 27/00*  (2006.01)

(52) U.S. Cl. ........................................ 707/104.1; 386/4
(58) Field of Classification Search .............. 707/104.1; 386/4, 46, 95, 125
See application file for complete search history.

(56) References Cited

U.S. PATENT DOCUMENTS 6,453,116 B1 * 9/2002 Ando et al. .................. 386/68

(Continued)

FOREIGN PATENT DOCUMENTS

EP    1021048    7/2000

(Continued)

OTHER PUBLICATIONS

MacKay et al, "DIVA: Exploratory Data Analysis with Multimedia Streams", CHI 98, Apr. 18-23, 1998, pp. 416-423.*
Search Report Dated Mar. 18, 2003.

*Primary Examiner*—Uyen Le
(74) *Attorney, Agent, or Firm*—Joseph J. Laks; Harvey D. Fried; Joel M. Fogelson

(57) ABSTRACT

The DVD Stream Recording standard defines application packets as the logically smallest units created from the input data stream during recording. Usually the conversion from a point on the time axis to a corresponding application packet is realized by using a mapping list available in the navigation data. However, depending on the target time and a Stream Object selected, the match found can vary significantly. The invention allows editing a recorded stream of application packets with higher precision. The stream comprises at least a first application packet having a first arrival time stamp and a subsequent second application packet having a second arrival time stamp. For editing the recorded stream a discrete time is input that is a start time or an end time and has a value between the first arrival time stamp and the second arrival time stamp. The discrete time is mapped onto the first or the second arrival time stamp, and the recorded stream is edited correspondingly.

7 Claims, 3 Drawing Sheets

U.S. PATENT DOCUMENTS

Figure 1:
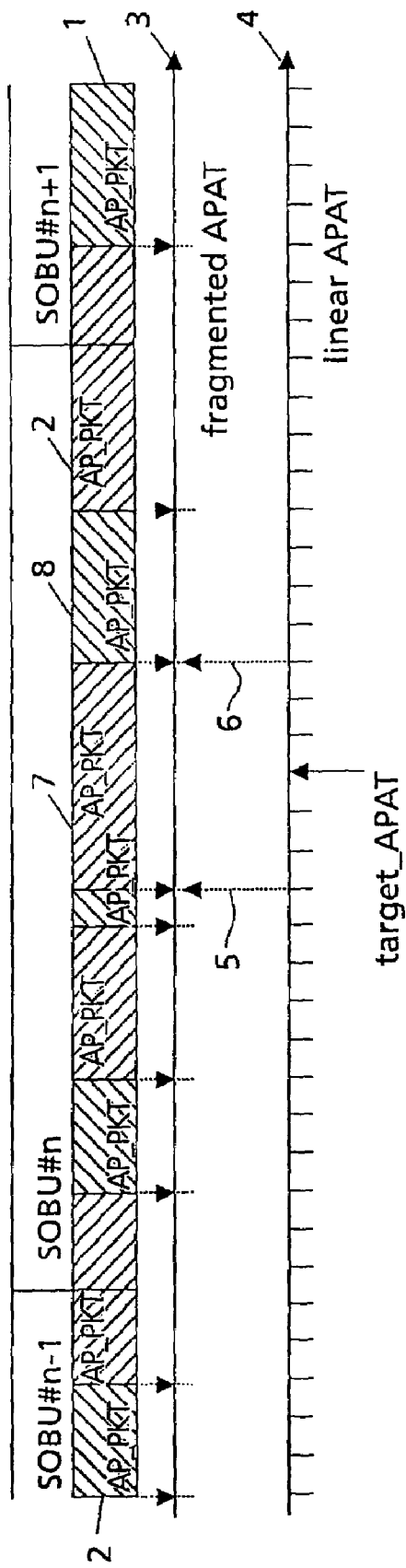

| | | | |
|---|---|---|---|
| 6,850,696 B1 * | 2/2005 | Van Gestel | 386/95 |
| 7,043,139 B1 * | 5/2006 | Schiller et al. | 386/95 |
| 2001/0012438 A1 | 8/2001 | Ando et al. | |
| 2001/0014058 A1 | 8/2001 | Ando et al. | |
| 2001/0048804 A1 * | 12/2001 | Yoo et al. | 386/69 |
| 2002/0097988 A1 * | 7/2002 | Yoon et al. | 386/98 |
| 2004/0213545 A1 * | 10/2004 | Park et al. | 386/46 |
| 2004/0240844 A1 * | 12/2004 | Ostermann et al. | 386/52 |

FOREIGN PATENT DOCUMENTS

| | | |
|---|---|---|
| JP | 2001-167559 | 6/2001 |
| JP | 2001-169246 | 6/2001 |
| JP | 2001-291373 | 10/2001 |
| JP | 2001-320663 | 11/2001 |
| WO | WO 00/52693 | 9/2000 |

* cited by examiner

METHOD FOR EDITING A RECORDED STREAM OF APPLICATION PACKETS, AND CORRESPONDING STREAM RECORDER

This application claims the benefit, under 35 U.S.C. § 365 of International Application PCT/EP02/13553, filed Nov. 30, 2002, which was published in accordance with PCT Article 21(2) on Jun. 19, 2003 in English and which claims the benefit of European patent application No. 01250435.3, filed Dec. 11, 2001.

The invention relates to the field of editing a recorded stream of application packets, in particular to editing a recorded digital versatile disk (DVD) data stream.

BACKGROUND

The DVD Stream Recording standard defines Application Packets (AP_PCK) as the logically smallest and therefore undividable units created from the input data stream during recording.

A typical user interface provides a time axis to access the recorded content like video or audio. Usually the conversion from a point on the time axis to a corresponding application packet is realised by using the mapping list available in the DVD Stream Recorder navigation data. By means of this method the search for a target time is generating a matching application packet.

INVENTION

However, depending on the target time and the Stream Object selected, the match found might vary unexpectedly widely and therefore result in unacceptably large deviations from the user's intention. A user wants, for example, removing the beginning of a video sequence and is selecting a corresponding target time of 01:44:02 (hour:minute:second) for the end of the cut. However, due to the specific constellation of that Stream Object this might result in a cut end time 03:50:00.

It is therefore an object of the present invention to provide an improved method for editing a recorded stream of application packets, and a corresponding stream recorder and computer program.

The underlying problem of the invention is solved by applying the features laid down in the independent claims. Advantageous additional embodiments of the invention are disclosed in the respective dependent claims.

The present invention is particularly advantageous in that it enables to accurately map a point on the time axis onto a corresponding application packet. This conversion algorithm applied considers particular limitations given by the DVD Stream Recording standard. This is important whenever such stream data is edited, i.e. when parts of the stream data are deleted. By using the conversion algorithm the user is able to control the editing result more precisely.

In accordance with a preferred embodiment of the invention a user interface is provided for a user's selection of a start time and an end time for the editing task. The start and end times of the editing task are selected by the user on a time axis provided by the user interface. The user interface presents recorded or user defined streams—like video or audio for example—in time units on a linear time scale. Especially the definition of editing tasks is based upon the access on the linear time axis by specifying the start and end times for editing.

In accordance with a further embodiment of the invention stuffing packets are inserted between application packets. The DVD stream data itself is organised in Application Packets (AP_PCK), which are the logically smallest undividable units. Each AP_PCK has an Application Packet Arrival Time (APAT) stamp indicating the time when the packet had arrived. Normally, application packets will not arrive at equidistant times, resulting in varying gaps between subsequent application packets. There can even be very large gaps; in this case stuffing packets need to be inserted. Such stuffing packets become necessary for DVD stream recording when a maximum time limit between two incoming AP_PCKs is exceeded. In such case, the mapping of the user's selected time is always performed on an application packet and not on a stuffing packet in order to include the stuffing packets within the editing task. For example, if the user intends to erase the portion of the stream between the start time and the end time it is advantageous including stuffing packets in the editing task for compacting the stream.

In principle, the inventive method is suited for editing a recorded stream of application packets, the stream comprising at least a first application packet having a first arrival time stamp and a subsequent second application packet having a second arrival time stamp, the method including:

inputting a discrete time, the discrete time being a start time or an end time for the editing of said recorded stream, wherein the discrete time has a value between said first arrival time stamp and said second arrival time stamp;

mapping said discrete time on said first arrival time stamp or on said second arrival time stamp;

editing the recorded stream.

DRAWINGS

Figure 2:
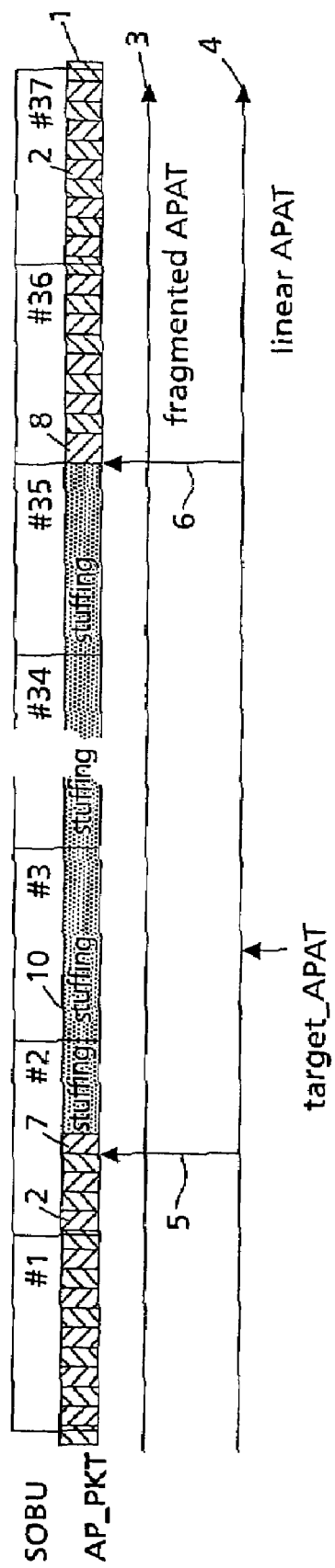
Figure 3:
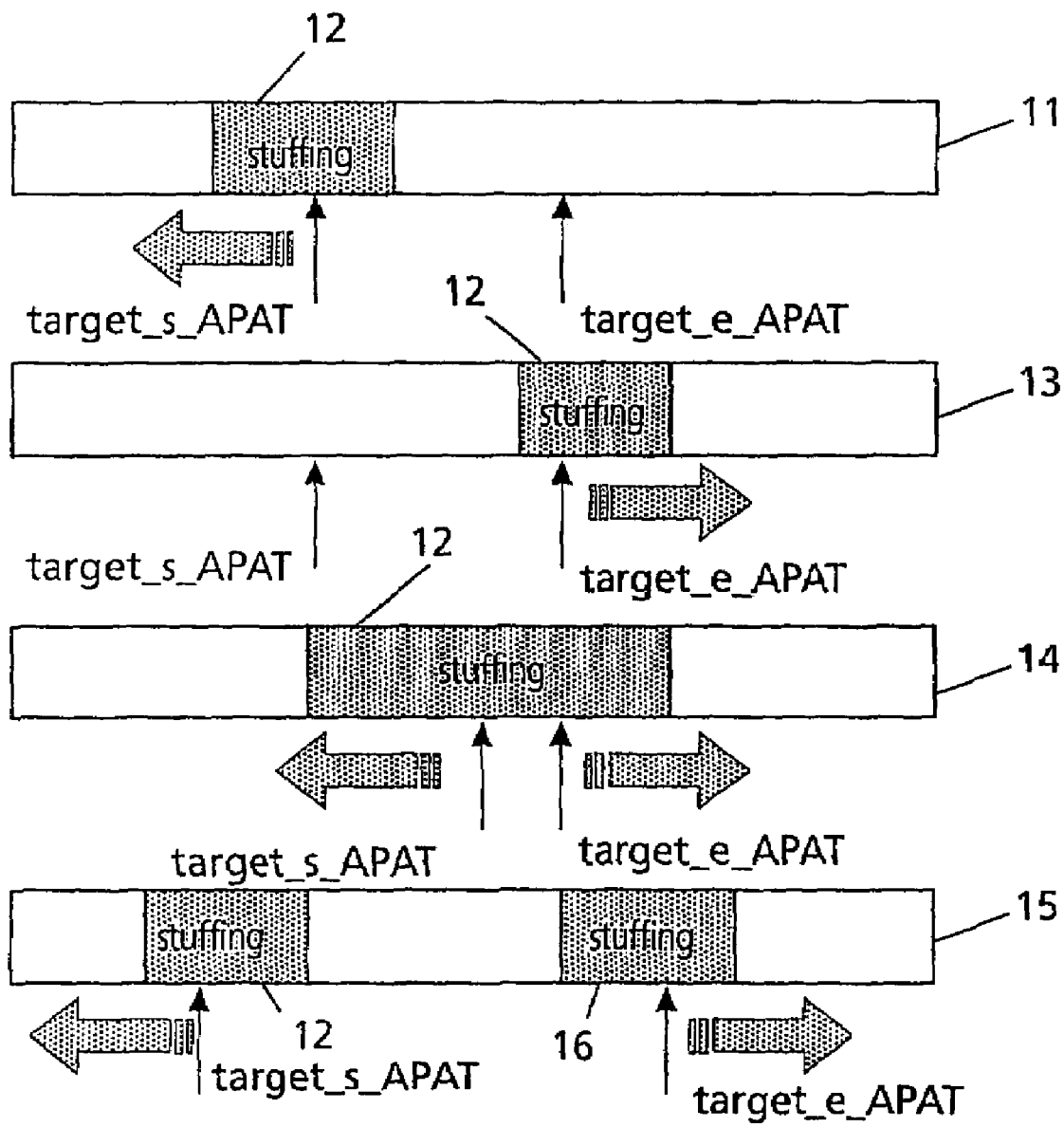

Exemplary embodiments of the invention are described with reference to the accompanying drawings, which show in:

FIG. 1 a first embodiment for the method of editing a recorded stream;

FIG. 2 a second embodiment for the method of editing a recorded stream having stuffing packets;

FIG. 3 further embodiments for the method of editing a recorded stream including stuffing packets.

EXEMPLARY EMBODIMENTS

The editing of original and user-defined program chains is a main feature of DVD Stream Recording. For setting up an editing process it is necessary to determine the start and end times of the editing task. The selected start and end times determine the type of editing and will cause a split, a cut head, a cut tail or a removal of the stream cell under edit.

FIG. 1 shows a DVD stream 1, which has been recorded on a DVD recorder. Stream 1 comprises a number of application packets (AP_PCK) 2 each of which is assigned to one of the stream object information files (SOBU). Each of the application packets 2 has an arrival time stamp APAB. The sequence of application packets 2 comprised in the recorded stream 1 creates a time axis 3 that is fragmented by the arrival time stamps of the application packets 2.

Further an additional time axis 4 is provided. For example, the additional time axis 4 is provided by the user interface of the DVD recorder. Time axis 4 has a linear scale of discrete times, for instance a 27 MHz clock. Each of the discrete times on the time axis 4 can be selected as a target start or end time for the editing task. In the example considered here a time 'target_APAT' has been selected as such a target start or end time.

There is no APAT on time axis 3 that exactly matches the selected time 'target_APAT' on time axis 4 because the time instant 'target_APAT' is in the middle of one of the application packets 2, which cannot be split. Therefore appropriate APATs on time axis 3 need to be identified as potential target times for mapping the time 'target_APAT'.

In the preferred embodiment considered here APAT 5 that is the closest preceding time on time axis 3 is selected as a potential target time, as well as APAT 6 that is the closest APAT on time axis 3 following time target_APAT on the time axis 4. The considered target times APAT 5 and APAT 6 correspond to the specific application packets 7 and 8, respectively, of the application packets 2 of the DVD stream 1. In principle, both of the considered target times APAT 5 and APAT 6 are an appropriate choice for mapping the time target_APAT in the example considered here.

One possibility is always selecting the preceding APAT 5, or always selecting the following APAT 6 in a situation as depicted in FIG. 1. Alternatively, the time difference between the time 'APAT 5' and the time ' target_APAT' and the time difference between the time 'target_APAT' and the time 'APAT 6' is determined. Then that APAT is selected which has the smallest time difference to the time target_APAT.

In the following an alternative embodiment is explained with respect to FIG. 2 whereby the same reference numbers are used to designate elements that are similar to the corresponding elements of FIG. 1.

The DVD stream 1 of FIG. 2 has a number of stuffing data packets 10. The SOBUs #3 to #35 are filled with stuffing packets 10. The first part of SOBU#2 is filled with stuffing packets 10 whereas the second part of SOBU#2 is filled with application packets 2. The time instant 'target_APAT' points into the stuffing packets 10 of SOBU#3. In this instance none of the stuffing packets 10 is selected as a potential target APAT but only application packets 7 and 8 with APATs 5 and 6, respectively, which neighbour the block of stuffing packets 10. Advantageously this way stuffing packets 10 can be eliminated on the occasion of the editing operation.

FIG. 3 shows a variety of scenarios: In the DVD stream 11 a stuffing block 12 of stuffing packets is included. A user has selected a target start time target_s_APAT and a target end time target_e_APAT for the editing to be performed. Because the target_s_APAT is pointing into the stuffing block 12 the application packet immediately preceding the stuffing block 12 is selected for mapping the target_s_APAT. The target_e_APAT can be mapped onto the application packet onto which it is pointing.

The DVD stream 13 shows an analogous situation where the target_e_APAT points onto the stuffing block 12 instead of the target_s_APAT. In this instance the application packet of the DVD stream 13 that immediately follows the stuffing block 12 is selected as the mapping target for the target_e_APAT.

In the case of DVD stream 14 both, the target_s_APAT and the target_e_APAT, point into a stuffing block 12. In this situation the application packet of the DVD stream 14 that immediately precedes stuffing block 12 is selected for the target_s_APAT, and the application packet immediately following stuffing block 12 is selected for the target_e_APAT.

In case of the DVD stream 15 an additional stuffing block 16 is present. The target_s_APAT points into stuffing block 12 and the target_e_APAT into stuffing block 16. In this instance the application packet immediately preceding the stuffing block 12 is selected for the target_s_APAT and the application packet immediately following the stuffing block 16 for the target_e_APAT.

An application packet, which is selected for the mapping of target_s_APAT or target_e_APAT, might not match a logical application unit border of the stream, for example the beginning of an I-frame in a video application or the beginning of an audio frame in an audio application. In this instance the user interface can propose an alternative application packet that is located at such a type of border and that is close to the originally selected application packet according to the user's selection. Evaluating application-specific stream information generates these alternatives.

Further it is possible that the user interface is signalling a large deviation between the target_s_APAT or the target_e_APAT and the respective selected application packet for the mapping to inform the user. It is a further option that, when the target start/end APAT time chosen and the assigned AP_PCK APAT time show a large deviation, the user interface is proposing alternative AP_PCK APAT times the user can select of.

The invention provides a means for the correct assignment of an arbitrary time from a linear user time scale to an available AP_PCK arranged in a fixed raster of AP_PCKs. This enables improving the user control on DVD stream recording editing tasks. Unexpected deviations from the intended editing target times can be indicated by means of the user interface and can be corrected before launching a final task execution.

The invention claimed is:

1. A method for determining based on a linear time axis a start packet and an end packet for an editing operation of a recorded data stream,
   said data stream including non-equidistant application packets to each one of which an arrival time stamp indicating the time when the packet had arrived is assigned,
   said data stream including at least a first application packet and a subsequent second application packet, wherein gaps can be included between succeeding application packets which gaps can comprise stuffing packets, and wherein as part of navigation data a mapping list is available which can be used for converting a point on the time axis to a corresponding application packet,
   said method including: inputting a discrete time from said linear time axis, said discrete time being a start time or an end time for said editing operation,
   wherein said discrete time has a time value between the time value of said first arrival time stamp and the time value of said second arrival time stamp;
   mapping said discrete time on said data stream; if said discrete time points into an application packet,
   comparing a first time difference between said first arrival time stamp and said discrete time with a second time difference between said discrete time and said second arrival time stamp, and selecting that one of the two application packets to which the smaller time difference is related;
   if said discrete time points into a stuffing packet and said discrete time refers to a start packet related to said editing operation, selecting the nearest application packet preceding that stuffing packet as said start packet related to said editing operation;
   if said discrete time points into a stuffing packet and said discrete time refers to an end packet related to said editing operation, selecting the nearest application packet following that stuffing packet as said end packet related to said editing operation.

2. The method according to claim 1 wherein, if said discrete time points into an application packet, selecting always as said start or end packet relating to said editing operation the nearest arrival time stamp that precedes said discrete time.

3. The method according to claim 1 wherein, if said discrete time points into an application packet, selecting always as said start or end packet relating to said editing operation the nearest arrival time stamp that follows said discrete time.

4. The method according to claim 1, further comprising the steps of:

determining whether the arrival time stamps associated with said first or said second application packet match a logical application unit border of said data stream;

if this is not true, determining at least one alternative application packet that is related to a border of said logical application unit;

outputting a suggestion for mapping said discrete time onto the arrival time stamp of said at least one alternative application packet.

5. The method according to claim 1, wherein said stream is a DVD stream.

6. The method of claim 1, wherein said method is stored on a computer readable medium.

7. Stream recorder comprising editing means for performing the method of claim 1.

* * * * *